US008701006B2

(12) United States Patent
Matsumoto et al.

(10) Patent No.: US 8,701,006 B2
(45) Date of Patent: Apr. 15, 2014

(54) IMAGE PROCESSING APPARATUS AND IMAGE PROCESSING METHOD

(75) Inventors: Yuichi Matsumoto, Fujisawa (JP); Yoshikazu Shibamiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1435 days.

(21) Appl. No.: 11/672,144

(22) Filed: Feb. 7, 2007

(65) Prior Publication Data

US 2007/0188659 A1     Aug. 16, 2007

(30) Foreign Application Priority Data

Feb. 13, 2006   (JP) ................................ 2006-035695

(51) Int. Cl.
*G06F 3/00*       (2006.01)
*H04N 1/46*      (2006.01)

(52) U.S. Cl.
USPC .......................................... 715/723; 358/540

(58) Field of Classification Search
USPC ........................... 715/723, 837, 838; 358/540
See application file for complete search history.

(56) References Cited

U.S. PATENT DOCUMENTS

| | | | |
|---|---|---|---|
| 5,596,346 A | * | 1/1997 | Leone et al. .................. 345/667 |
| 6,317,141 B1 | * | 11/2001 | Pavley et al. .................. 715/732 |
| 6,795,130 B2 | | 9/2004 | Shibamiya .................... 348/734 |
| 2002/0138829 A1 | | 9/2002 | Matsumoto et al. ............ 725/14 |
| 2003/0101237 A1 | | 5/2003 | Ban et al. ....................... 709/218 |
| 2003/0169286 A1 | * | 9/2003 | Misawa ......................... 345/716 |
| 2004/0049788 A1 | | 3/2004 | Mori et al. ....................... 725/58 |
| 2004/0117830 A1 | | 6/2004 | Ohno et al. ..................... 725/51 |
| 2004/0148629 A1 | | 7/2004 | Shibamiya et al. ............. 725/53 |
| 2005/0128351 A1 | | 6/2005 | Yamamoto et al. ........... 348/473 |
| 2005/0130613 A1 | | 6/2005 | Kutsuna et al. ............ 455/179.1 |
| 2005/0160462 A1 | | 7/2005 | Shikata et al. .................. 725/58 |
| 2005/0166242 A1 | | 7/2005 | Matsumoto et al. ............ 725/88 |
| 2005/0169685 A1 | | 8/2005 | Matsubayashi et al. ........ 400/62 |
| 2006/0050086 A1 | * | 3/2006 | Ono ............................... 345/629 |
| 2006/0156254 A1 | * | 7/2006 | Satake .......................... 715/838 |
| 2006/0176319 A1 | * | 8/2006 | Ida et al. ....................... 345/629 |

FOREIGN PATENT DOCUMENTS

JP        2003-196283       7/2003

\* cited by examiner

*Primary Examiner* — Rashawn Tillery
(74) *Attorney, Agent, or Firm* — Fitzpatrick, Cella, Harper & Scinto

(57) ABSTRACT

A DTV 10 generates a composite image by composing image data stored in a memory card 70 and displays this on a display unit 50 in a slideshow. When the DTV 10 receives a print instruction via a user interface unit 110 during the slideshow, the DTV 10 displays on the display unit 50 a print image selection window 501, which includes the composite image and the images that constitute the composite image. The DTV 10 prints the composite image or the image that has been selected via the print image selection window 501.

7 Claims, 20 Drawing Sheets

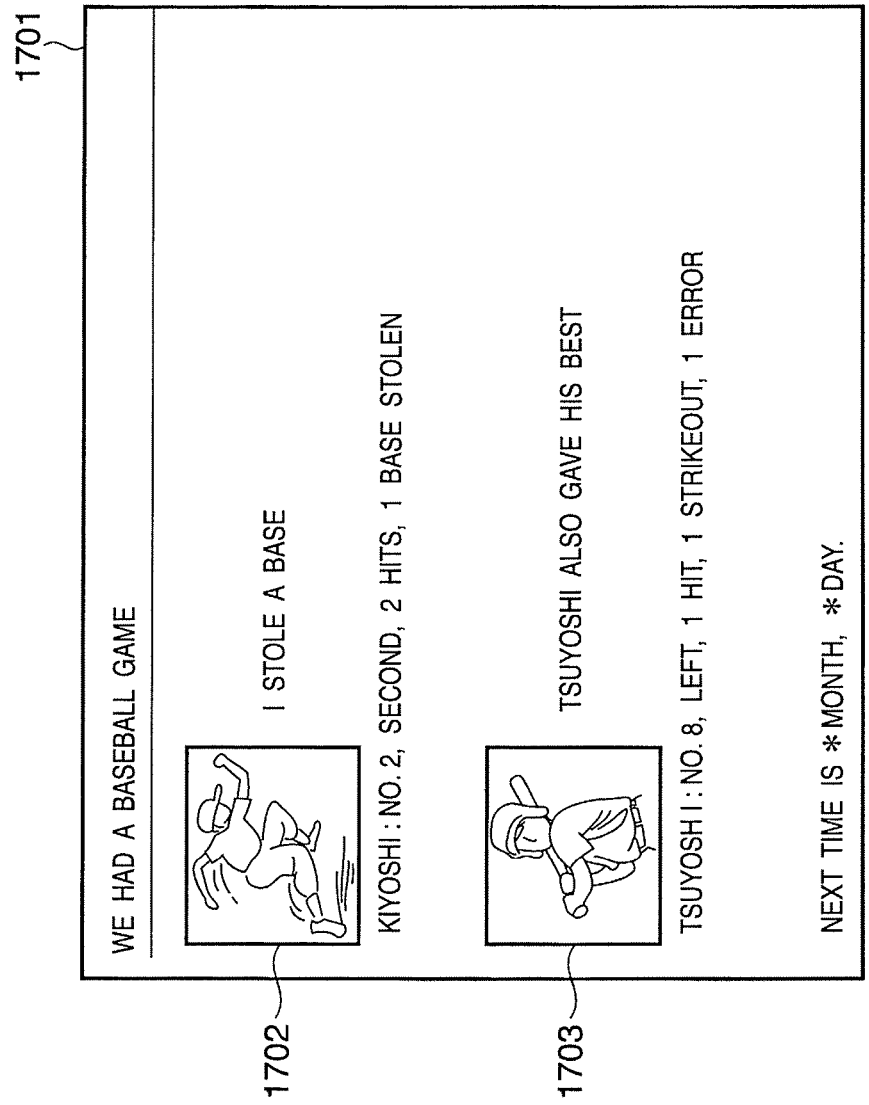

FIG. 18

```
<!DOCTYPE HTML PUBLIC "-//W3C//DTD HTML 4.0 Transitional//EN">
<HTML><HEAD>
<META http-equiv=Content-Type content= "text/html ; charset=Shift_JIS">
<META content= "MSHTML 6.00.2800.1505" name=GENERATOR></HEAD>
<BODY bgColor=#0080c0>
<P><FONT color=#00ffff size=5> WE HAD A BASEBALL GAME </FONT></P>
<FONT color=#008080 size=5>
<HR>

<P></FONT><IMG alt=" " hspace=0
src="file:///Attach¥42deec01.jpg" align=middle
border=5> I STOLE A BASE </P>
<P><FONT color=#00ffff><FONT size=2> KIYOSHI : NO. 2, SECOND </FONT>
<FONT size=2> 2 HITS, 1 BASE STOLEN </FONT></FONT></P>
<DIV><IMG alt=" " hspace=0>
src="file:///Attach¥42deec02.jpg" align=middle
border=5>TSUYOSHI ALSO GAVE HIS BEST </DIV>
<DIV>  ; </DIV><!--SIGN-->
<DIV>
<P><FONT color=#00ffff><FONT size=2>TSUYOSHI : NO. 8, LEFT </FONT>
<FONT size=2> 1 HIT, 1 STRIKEOUT, 1 ERROR </FONT><FONT size=2>
</FONT></FONT></P></DIV>
<DIV>  ; </DIV>
<DIV>  ; </DIV>
<DIV><FONT color=#800000>NEXT TIME IS *MONTH, *DAY. </FONT></DIV>
<DIV>  ; </DIV><!--SIGN--></BODY></HTML>
```

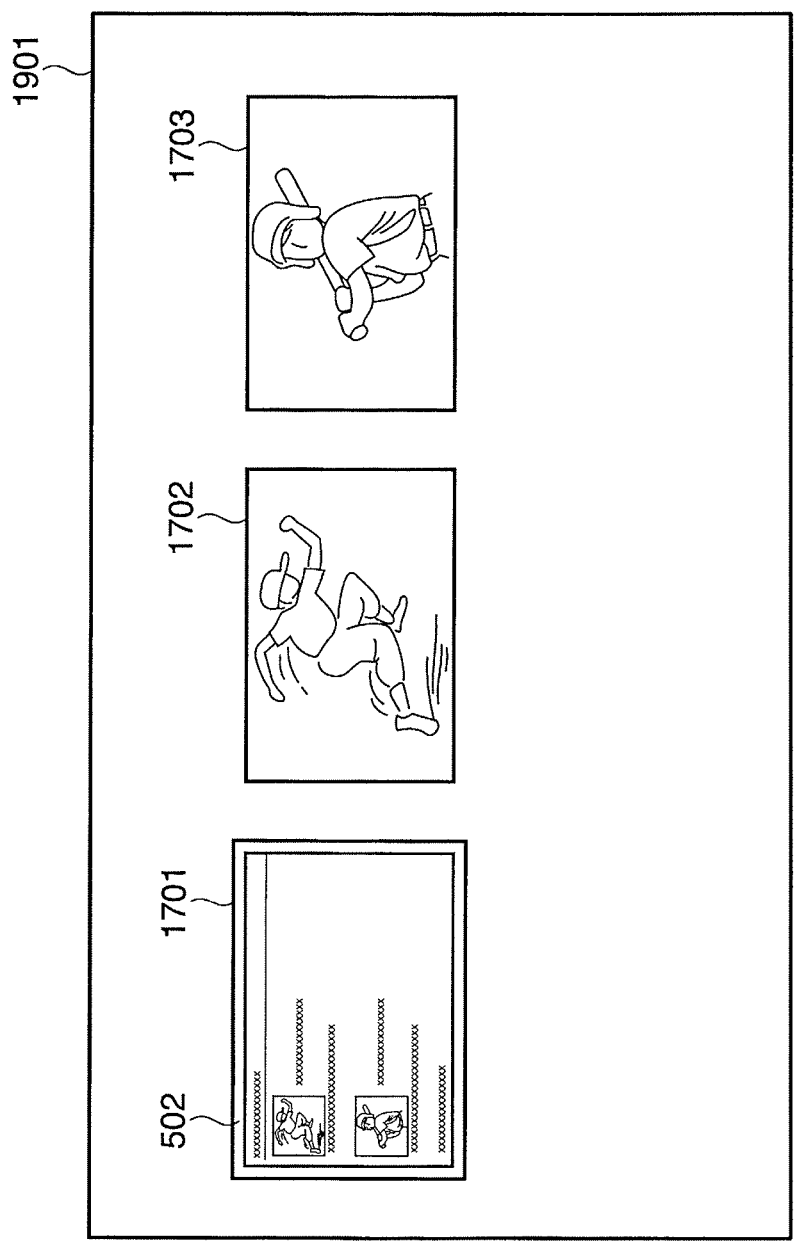

IMAGE PROCESSING APPARATUS AND IMAGE PROCESSING METHOD

BACKGROUND OF THE INVENTION

1. Field of the Invention

The present invention relates to image processing apparatuses and image processing methods by which images that are targets for printing output or the like are made selectable by a user.

2. Description of the Related Art

Along with increasing functionality in image processing apparatuses such as personal computers (PC) and digital televisions (DTV) in recent years, more and more image processing apparatuses are able to display composite images—those comprising a plurality of images.

Furthermore, methods are known (see Japanese Patent Application laid-open No. 2003-196283) by which a portion of an image being displayed by an image processing apparatus is selected by a user and printed or displayed on the image processing apparatus. According to a method disclosed in Japanese Patent Application laid-open No. 2003-196283, the user can easily and flexibly select a desired portion from a certain single image.

When the user instructs the image processing apparatus to output an image, it is conceivable that sometimes the user will want to output the entire composite image and sometimes the user will want to output one of a number of individual images that constitute the composite image.

However, Japanese Patent Application laid-open No. 2003-196283 gives no consideration to cases in which a single composite image is generated from a plurality of images. Consequently, Japanese Patent Application laid-open No. 2003-196283 gives no consideration to a user easily and flexibly selecting images to be output from a composite image.

It should be noted that "image output" is not limited to sending image data or the like to a specific apparatus. Specifically, this includes, for example, recording to a storage medium, printing using a printer, and transferring to an external apparatus.

The present invention has been devised in light of these circumstances and it is an feature therein to provide a technique that enables a user to easily and flexibly select images to be output from a composite image.

SUMMARY OF THE INVENTION

It is a feature of the present invention to solve the problems presented by the conventional means.

According to an aspect of the present invention, there is provided an image processing apparatus, comprising:

a first display control unit adapted to display on a display unit a composite image generated using a plurality of images;

a first acceptance unit adapted to accept an output instruction from a user;

a second display control unit adapted to display on the display unit a selection window in which the composite image displayed on the display unit or each of the plurality of images being used in the composite image are selectable as a target image to be output in response to the output instruction; and an output unit adapted to output an image selected by the user in the selection window as the target image to be output.

According to another aspect of the present invention, there is provided an image processing apparatus, comprising:

a first display control unit adapted to display an image on a display unit;

a generation unit adapted to generate a composite image using a plurality of images;

a first acceptance unit adapted to accept an output instruction from a user;

a second display control unit adapted to, if the plurality of images were being displayed on the display unit at a point of time when the output instruction was accepted, display on the display unit a selection window in which images that were being displayed on the display unit at the point of time when the output instruction was accepted or a composite image generated from the plurality of images by the generation unit are selectable as a target image to be output in response to the output instruction; and an output unit adapted to output an image selected by the user in the selection window as the target image to be output.

According to another aspect of the present invention, there is provided an image processing apparatus, comprising:

a first display control unit adapted to display on a display unit a document that includes at least one image;

a first acceptance unit adapted to accept an output instruction from a user;

a second display control unit adapted to display on the display unit a selection window in which a document being displayed on the display unit or each of the at least one image contained in the document are selectable as a target image to be output or a target document to be output in response to the output instruction; and an output unit adapted to output an image or a document selected by the user in the selection window as the target image to be output or the target document to be output.

According to another aspect of the present invention, there is provided an image processing method, comprising:

a first display control step of displaying on a display unit a composite image generated using a plurality of images;

a first acceptance step of accepting an output instruction from a user;

a second display control step of displaying on the display unit a selection window in which the composite image displayed on the display unit or each of the plurality of images being used in the composite image are selectable as a target image to be output in response to the output instruction; and an output step of outputting an image selected by the user in the selection window as the target image to be output.

According to another aspect of the present invention, there is provided an image processing method, comprising:

a first display control step of displaying an image on a display unit;

a generation step of generating a composite image using a plurality of images;

a first acceptance step of accepting an output instruction from a user;

a second display control step of, if the plurality of images were being displayed on the display unit at a point of time when the output instruction was accepted, displaying on the display unit a selection window in which images that were being displayed on the display unit at the point of time when the output instruction was accepted or a composite image generated from the plurality of images in the generation step are selectable as a target image to be output in response to the output instruction; and an output step of outputting an image selected by the user in the selection window as the target image to be output.

According to another aspect of the present invention, there is provided an image processing method, comprising:

a first display control step of displaying on a display unit a document that includes at least one image;

a first acceptance step of accepting an output instruction from a user;

a second display control step of displaying on the display unit a selection window in which a document being displayed on the display unit or each of the at least one image contained in the document are selectable as a target image to be output or a target document to be output in response to the output instruction; and an output step of outputting an image or a document selected by the user in the selection window as the target image to be output or the target document to be output.

According to another aspect of the present invention, there is provided a computer program stored in a computer-readable storage medium, which causes a computer to execute an image processing method, the image processing method comprising:

a first display control step of displaying on a display unit a composite image generated using a plurality of images;

a first acceptance step of accepting an output instruction from a user;

a second display control step of displaying on the display unit a selection window in which the composite image displayed on the display unit or each of the plurality of images being used in the composite image are selectable as a target image to be output in response to the output instruction; and an output step of outputting an image selected by the user in the selection window as the target image to be output.

According to another aspect of the present invention, there is provided a computer program stored in a computer-readable storage medium, which causes a computer to execute an image processing method, the image processing method comprising:

a first display control step of displaying an image on a display unit;

a generation step of generating a composite image using a plurality of images;

a first acceptance step of accepting an output instruction from a user;

a second display control step of, if the plurality of images were being displayed on the display unit at a point of time when the output instruction was accepted, displaying on the display unit a selection window in which images that were being displayed on the display unit at the point of time when the output instruction was accepted or a composite image generated from the plurality of images in the generation step are selectable as a target image to be output in response to the output instruction; and an output step of outputting an image selected by the user in the selection window as the target image to be output.

According to another aspect of the present invention, there is provided a computer program stored in a computer-readable storage medium, which causes for executing on a computer to execute an image processing method, the image processing method comprising:

a first display control step of displaying on a display unit a document that includes at least one image;

a first acceptance step of accepting an output instruction from a user;

a second display control step of displaying on the display unit a selection window in which a document being displayed on the display unit or each of the at least one image contained in the document are selectable as a target image to be output or a target document to be output in response to the output instruction; and an output step of outputting an image or a document selected by the user in the selection window as the target image to be output or the target document to be output.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

FIG. 17 illustrates a composite image, which is one example of an HTML document displayed in the browser.

FIG. 18 shows source code of the HTML document that constitutes the composite image shown in FIG. 17.

FIG. 19 illustrates one example of a print image selection window according to the second embodiment.

DESCRIPTION OF THE EMBODIMENTS

Embodiments of the present invention are described below with reference to the accompanying drawings. Each of the separate embodiments to be described below will be useful in understanding various concepts (e.g., the generic, mid-level, and subordinate) of the present invention.

It should be noted that the technical scope of the present invention is to be established by the claims and not limited by the following separate embodiments. Furthermore, not all combinations of features described in the embodiments are necessarily essential as solving means of the invention.

[First Embodiment]

<Configuration of Digital Television (DTV) 10>

Figure 1:
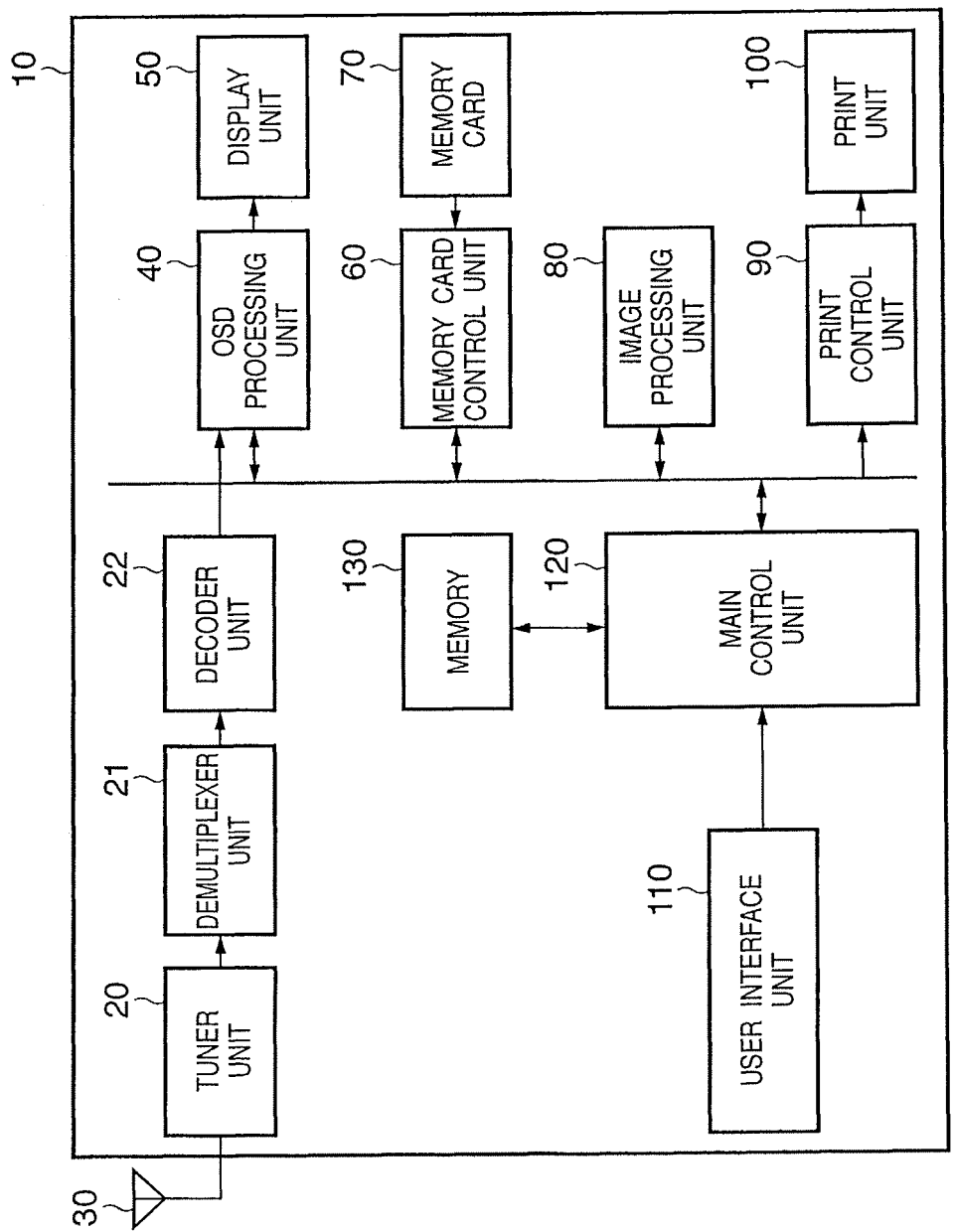
FIG. 1 is a block diagram showing a configuration of a DTV, which is an example of an image processing apparatus according to a first embodiment.

FIG. 1 is a block diagram showing a configuration of a DTV 10, which is an example of an image processing apparatus according to a first embodiment.

The DTV 10 is capable of generating a composite image by composing a plurality of images obtained from a memory card 70, which is to be described later. Furthermore, it is also provided with a slideshow function, by which images obtained from the memory card 70 and composite images are successively displayed at a predetermined interval.

A tuner unit 20 executes various processes such as demodulation, error correction, and descrambling on signals that are input from an antenna 30 and generates digital data in a format called a transport stream (TS). TS data is time-division multiplexed data of a plurality of channels, including image data, sound data and electronic program guide (EPG) data.

A demultiplexer unit 21 extracts image data and sound data from the TS data that is input from the tuner unit 20 and outputs it to a decoder unit 22.

The decoder unit 22 decodes image data that is input from the demultiplexer unit 21 and outputs the decoded data to a display unit 50 via an OSD (onscreen display) processing unit 40. The decoder unit 22 also decodes sound data that is input from the demultiplexer unit 21 and it outputs the decoded data to a sound output unit (not shown).

The antenna 30 receives broadcast signals and outputs to the tuner unit 20.

The OSD processing unit 40 superimposes information, such as that concerning broadcast channel, program title, time, various settings menus and a cursor, onto image data that is input from the decoder unit 22 and an image processing unit 80 which is to be described later.

The display unit 50 comprises a liquid crystal display, for example, and displays image data that is input from the OSD processing unit 40.

Thus, a user is able to use the DTV 10 to hear and watch television programs. That is, the DTV 10 is configured so as to receive broadcast signals with the antenna 30, extract and decode program images and program sound by processing with the tuner unit 20, the demultiplexer unit 21, and the decoder unit 22, and finally carry out display on the display unit 50.

A memory card control unit 60 is an interface for enabling the DTV 10 to read and write data from and to the memory card 70.

The memory card 70 is a storage medium such as a Compact Flash (registered trademark) or an SD (registered trademark) memory card and is capable of storing image data. Instead of these types of memory cards, the memory card 70 may be a storage medium such as a hard disk (HDD). Image data that is stored on the memory card 70 is encoded in JPEG format, for example.

The image processing unit 80 decodes image data that is read out from the memory card 70 into a format displayable on the display unit 50. Using well-known techniques, the image processing unit 80 is also capable of generating a composite image by composing multiple sets of image data that are read out from the memory card 70.

A print control unit 90 converts image data, which is input from the decoder unit 22 and the image processing unit 80, into a format printable by a print unit 100 and controls print process using the print unit 100.

The print unit 100 prints the image data that has been input from the print control unit 90 onto a printing medium such as paper.

A user interface unit 110 is provided with such items as a slideshow button B1, a stop button B2, a print button B3, direction buttons B4 through B7, and an OK button B9 (none of B1 through B9 is shown in the drawing). When the user operates the buttons or the like of the user interface unit 110, the user interface unit 110 notifies a main control unit 120, which is to be described next, of the user operations.

The main control unit 120 is a processor that performs overall control of the DTV 10.

A memory 130 stores a control program for the main control unit 120 to control the DTV 10. For example, the aforementioned slideshow function of the DTV 10 is achieved using this control program.

It should be noted that although the display unit 50 and the print unit 100 are described as being contained in the DTV 10, the display unit 50 and the print unit 100 may be external apparatuses that are communicably connected to the DTV 10.

<Outline of Process of Selecting Image to be Printed>

An outline of a process by which an image to be printed is selected by a user from a composite image generated by the image processing unit 80 is described with reference to FIGS. 2 through 5.

It should be noted that as mentioned above, "printing" includes "outputting," which is a generic concept. Accordingly, instead of printing the selected image using the print unit 100, the DTV 10 may output the selected image to an external PC (personal computer) (not shown) or the like as an output unit.

Figure 2:
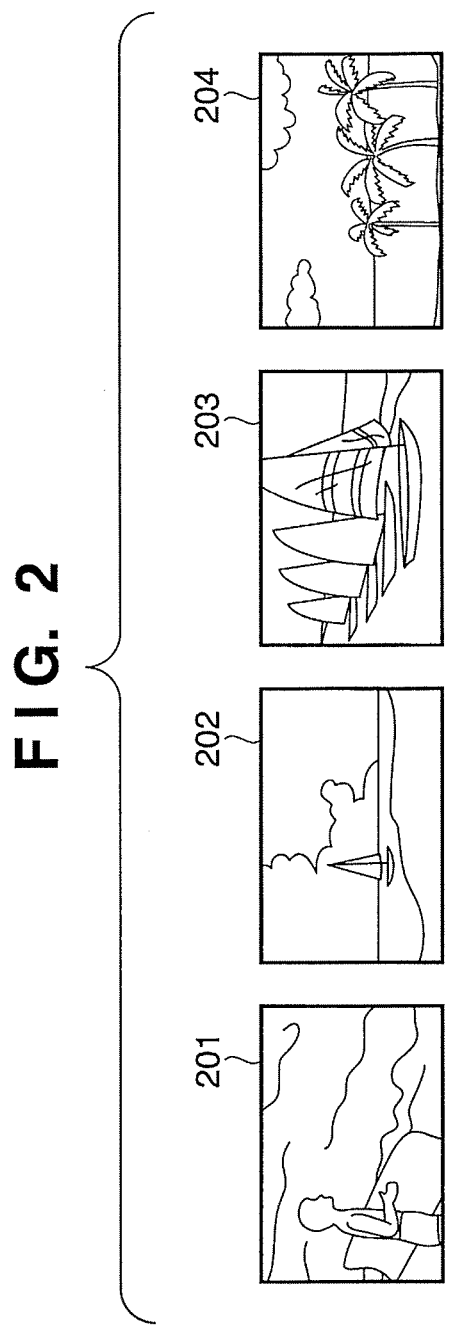
FIG. 2 illustrates one example of image data stored in a memory card of the DTV.

FIG. 2 illustrates one example of image data stored in the memory card 70. Only four images 201 to 204 are shown in FIG. 2, but in fact many more sets of image data may be stored on the memory card 70.

Figure 3:
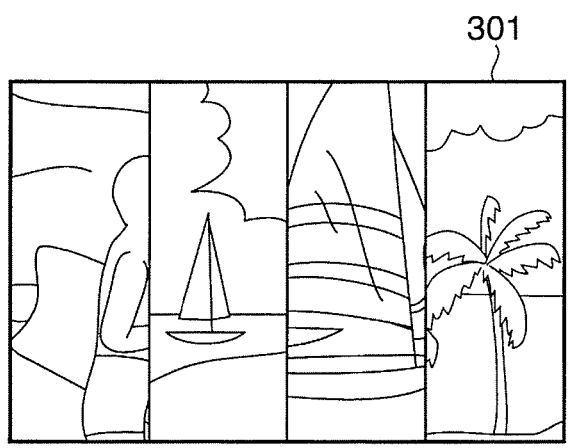
FIG. 3 illustrates one example of a composite image that has been generated by an image processing unit of the DTV based on the images shown in FIG. 2.

FIG. 3 illustrates one example of a composite image 301 that has been generated by the image processing unit 80 based on the images 201 to 204. In the present embodiment, the image processing unit 80 generates the composite image 301 by cutting out a vertical strip portion from each of the four images, but the number and shape of images to be used are not limited to this.

Figure 4:
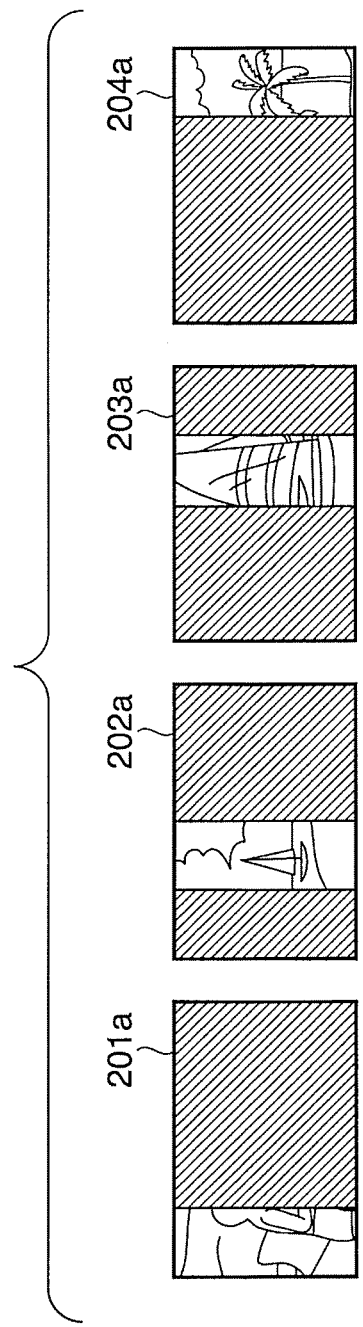
FIG. 4 illustrates one example of partial images of the images shown in FIG. 2 that are included in the composite image shown in FIG. 3.

FIG. 4 illustrates one example of partial images 201a to 204a contained in the composite image 301 of the images 201 to 204.

In the present embodiment, it is assumed that the main control unit 120 has been instructed by the user via the user interface unit 110 to generate a composite image of vertical strips that have been cut out of the four images and to display these in a slideshow.

The main control unit 120 successively reads out the four sets of image data from the memory card 70 and displays composite image 301 one after another on the display unit 50 at a predetermined time interval. When the main control unit 120 receives a print instruction from the user via the user interface unit 110, the main control unit 120 displays a print image selection window 501 (see FIG. 5) on the display unit 50.

Figure 5:
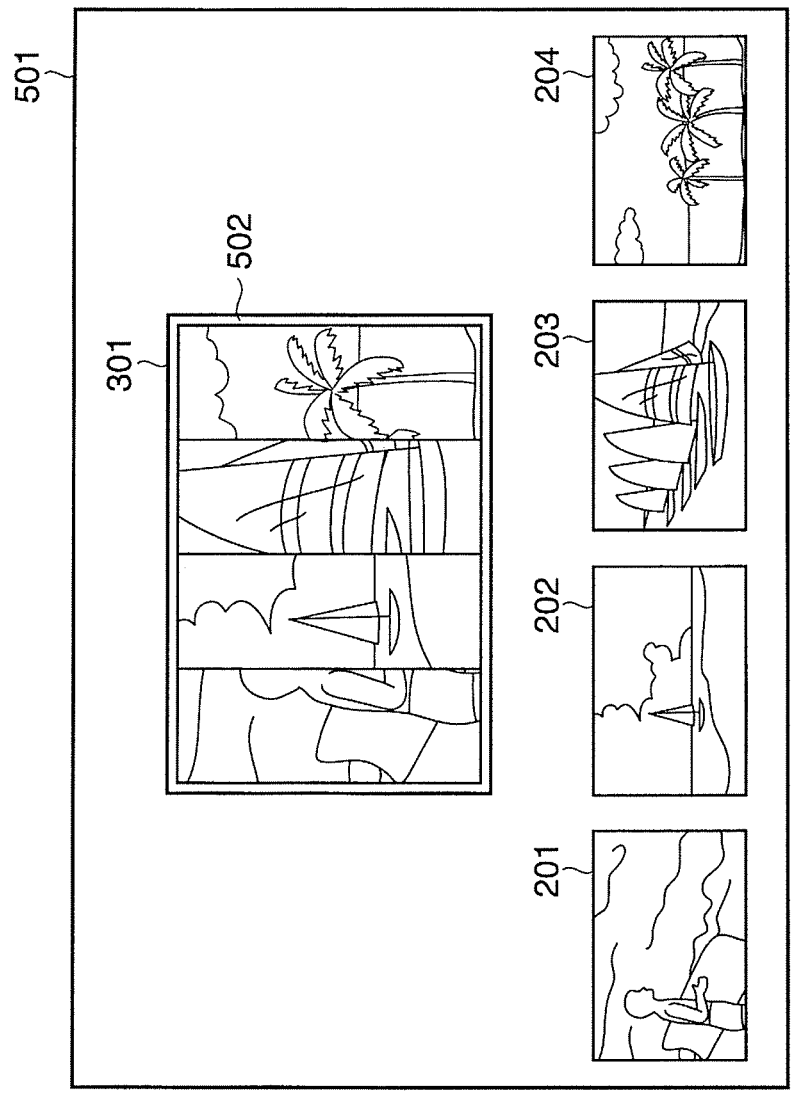
FIG. 5 illustrates one example of a print image selection window.

FIG. 5 illustrates one example of the print image selection window 501. The print image selection window 501 includes the images 201 through 204, the composite image 301, and a cursor 502. In the print image selection window 501, the user can move the cursor 502 using the user interface unit 110 and select an image to print from among the images 201 through 204 and the composite image 301. In other words, the user can freely select and print an image from the composite image 301 and the images 201 through 204 whose parts constitute the composite image 301. It should be noted that the cursor 502 may be superimposed on the print image selection window 501 by the OSD processing unit 40.

Moreover, each of the images 201 through 204 and the composite image 301 is an image that can be chosen for printing. FIG. 5 displays the composite image 301 in a large format, but printing of any of the images 201 through 204 and the composite image 301 results in printing on paper of identical size.

<Details of Process of Selecting Image to be Printed>

Details of a process by which an image to be printed is selected by a user from a composite image generated by the image processing unit 80 is described with reference to the flowchart of FIG. 6. In the present embodiment, it is assumed that the process of this flowchart commences when the main control unit 120 receives an instruction to commence a slideshow via the user interface unit 110.

At step S601, the main control unit 120 displays on the display unit 50 a user interface that enables the user to select a number of sets of image data to be used in generating a composite image. The main control unit 120 determines the number of sets of image data to be used in generating the composite image according to the number (four in the present embodiment) provided by the user via the user interface unit 110.

At step S602, the main control unit 120 displays on the display unit 50 a user interface that enables the user to select a layout for generating the composite image. The main control unit 120 determines the layout to be used in generating the composite image according to the layout indicated by the user via the user interface unit 110. In the present embodiment, it is assumed that a "vertical strip shape" layout (see FIG. 3) is selected.

At step S603 and step S604, the main control unit 120 reads out from the memory card 70 the number of sets of image data determined at step S601 and inputs these to the image processing unit 80.

At step S605, the image processing unit 80 composes the image data that has been input at step S603 to generate the composite image 301 and the main control unit 120 displays the composite image 301 on the display unit 50. The layout of the composite image 301 is the layout determined at step S602.

At step S606, the main control unit 120 determines whether or not the print button B3 of the user interface unit 110 has been pressed. If it has not been pressed, the procedure proceeds to step S607, but if it has been pressed, the procedure proceeds to step S608.

At step S607, the main control unit 120 determines whether or not a predetermined time, which is a time during which one composite image in the slideshow is continuously displayed, has elapsed. If it has elapsed, the procedure returns to step S603 and the series of processes is repeated to generate the next composite image 301. If it has not elapsed, the procedure returns to step S606. It should be noted that the predetermined time in step S607 may be set by the user via the user interface unit 110.

At step S608, the main control unit 120 generates the print image selection window 501 (see FIG. 5) and displays it on the display unit 50.

At step S609, the main control unit 120 accepts from the user via the user interface unit 110 a selection of an image to be printed. In step S609, the cursor 502 moves when the user operates the direction buttons B4 through B7 of the user interface unit 110 and when the OK button B9 is pressed, the image that is has been selected by the cursor 502 is selected as a print target.

At step S610, the print unit 100 prints the image that has been selected at step S609 and the procedure returns to step S605.

It should be noted that although not shown in the drawings, in cases when the stop button B2 of the user interface unit 110 is pressed or when all the image data stored on the memory card 70 has been composed and displayed, the main control unit 120 stops the slideshow.

MODIFIED EXAMPLE 1

A modified example 1 of the first embodiment is described with reference to FIGS. 7 to 11. In the above-described first embodiment, the partial images in the composite image 301 of the partial images 201a through 204a extracted from the images 201 through 204 are kept consistent (see FIGS. 2 to 4) in positions arranged in the composite image 301. In modified example 1, portions considered to be the most important (characteristic) in each image are selected as the partial images regardless of the respective position of the partial image in the composite image.

Figure 7:
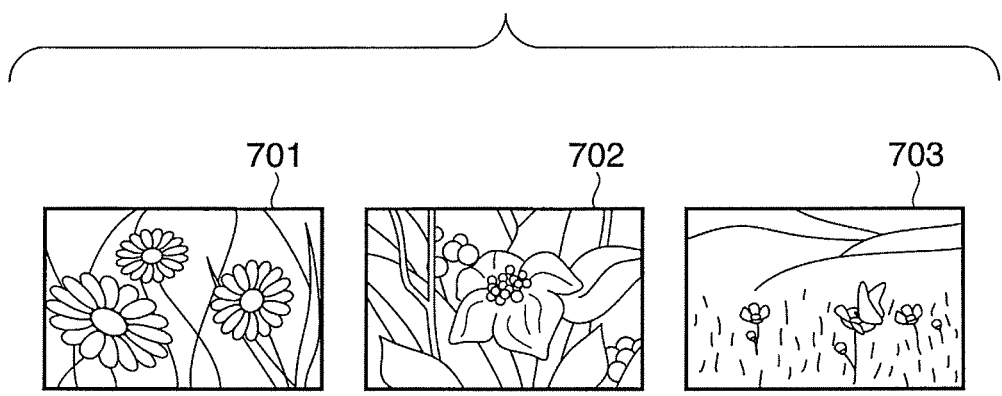
FIG. 7 illustrates one example of image data stored in the memory card of the DTV in modified example 1.

FIG. 7 illustrates one example of image data stored on the memory card 70 in modified example 1.

Figure 8:
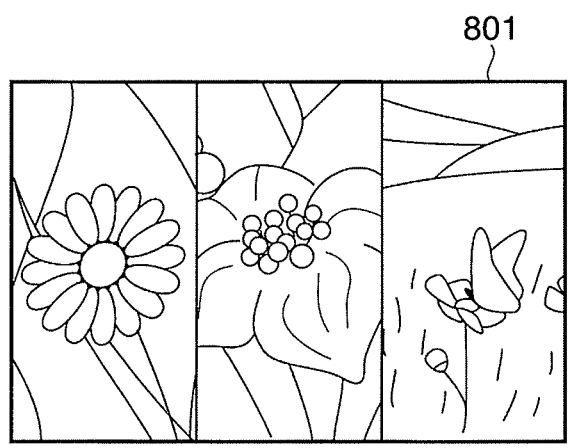
FIG. 8 illustrates one example of a composite image that has been generated by the image processing unit of the DTV based on the images shown in FIG. 7.

FIG. 8 illustrates one example of a composite image 801 that has been generated by the image processing unit 80 based on images 701 to 703.

Figure 9:
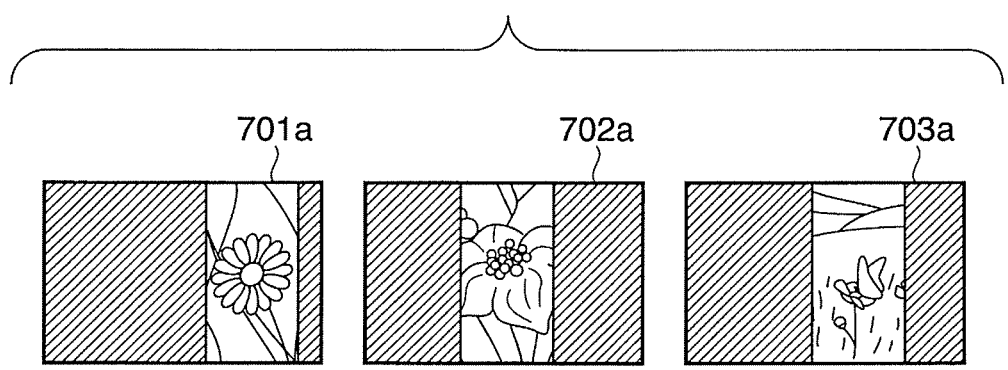
FIG. 9 illustrates one example of partial images of the images shown in FIG. 7 that are included in the composite image shown in FIG. 8.

FIG. 9 illustrates one example of partial images 701a to 703a contained in the composite image 801 of the images 701 to 703.

As is evident from FIGS. 7 to 9, the composite image 801 is generated from the partial images 701a to 703a, which are considered to be the most important (characteristic) in the images 701 to 703. An arbitrary well-known technique can be used as a technique for extracting a portion considered to be the most important (characteristic), including, for example, analyzing luminance components within the images and using focusing position information at image capture time, which is contained in the image data.

Figure 10:
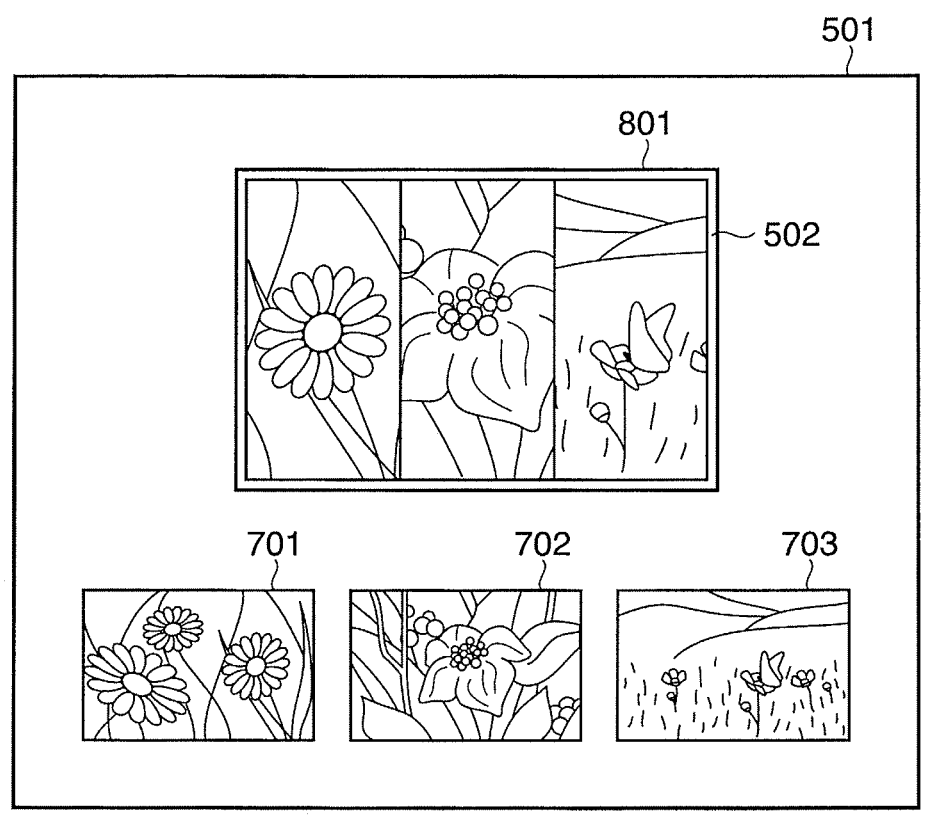
FIG. 10 illustrates one example of the print image selection window in modified example 1.
Figure 11:
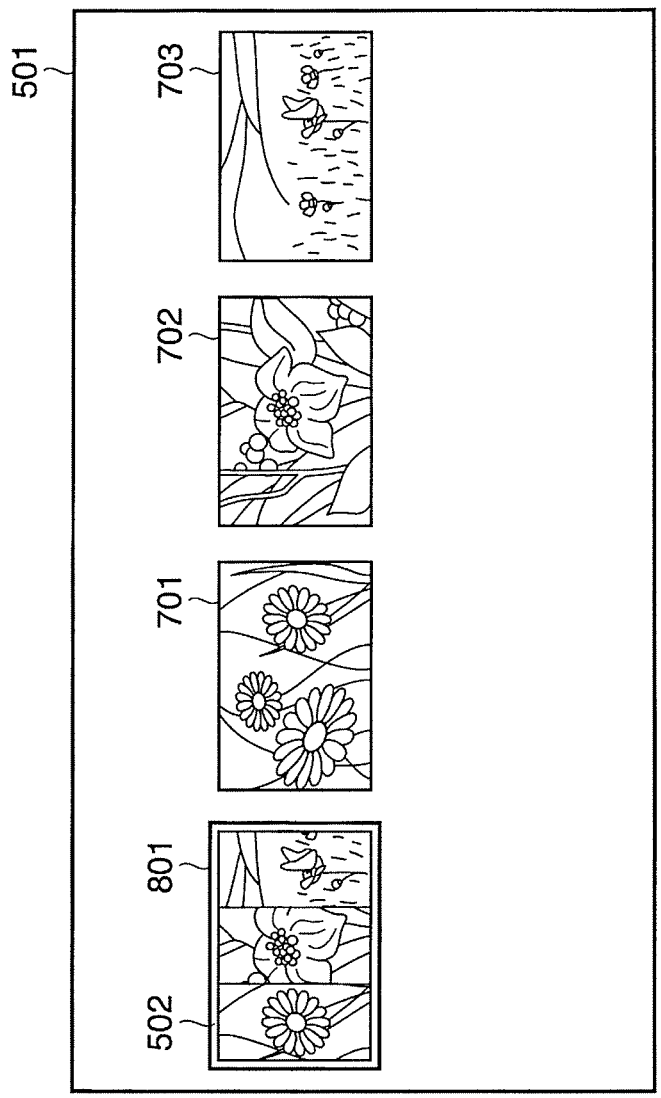
FIG. 11 illustrates another example of the print image selection window in modified example 1.

Furthermore, as is evident from FIGS. 10 and 11, print candidate images (that is, the composite image 801 and the images 701 to 703) can be arranged in arbitrary positions in the print image selection window 501. That is, in FIG. 10, the composite image is being displayed enlarged and emphasized in the same manner as in FIG. 5. However, as shown in FIG. 11, in the print image selection window 501, the composite image 801 and the images 701 to 703 may be arranged on the same row having the same size and, although not shown in the drawings, other sizes and arrangements may also be employed.

Moreover, since the composite image 801 and the images 701 through 703 are displayed at approximately the same size as in FIG. 11, it becomes easier to understand that picking any one of the images will result in printing on identically sized paper.

MODIFIED EXAMPLE 2

A modified example 2 of the first embodiment will now described with reference to FIGS. 12 through 15. In the slideshow in the above-described first embodiment, the main control unit 120 displayed the composite image on the display unit 50 (see step S605 in FIG. 6). In modified example 2, description is given of other forms of display in the slideshow and the print image selection window 501 corresponding to these.

Figure 12:
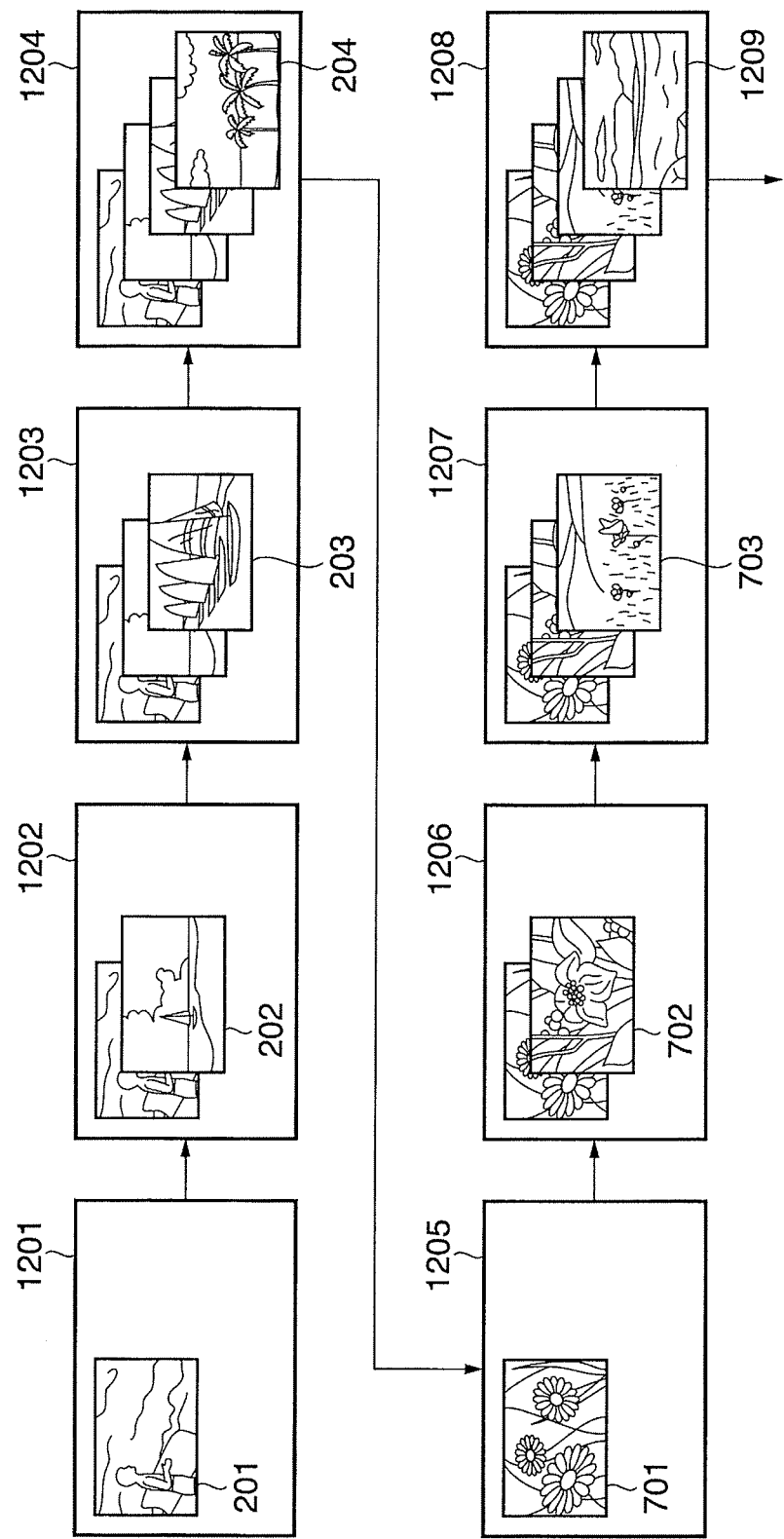
FIG. 12 shows an appearance of a slideshow in modified example 2.

FIG. 12 shows the appearance of a slideshow in modified example 2. As indicated by symbols 1201 through 1208, the main control unit 120 first displays the image 201 on the display unit 50, then overlays and displays the image 202 on the image 201. Overlaying of the images may be carried out by the image processing unit 80, for example. When the image 203 and the image 204 are further overlaid and displayed and there are four images displayed on the display unit 50 (symbol 1204), the next image is displayed alone (symbol 1205) in the same manner as the first image.

Figure 13:
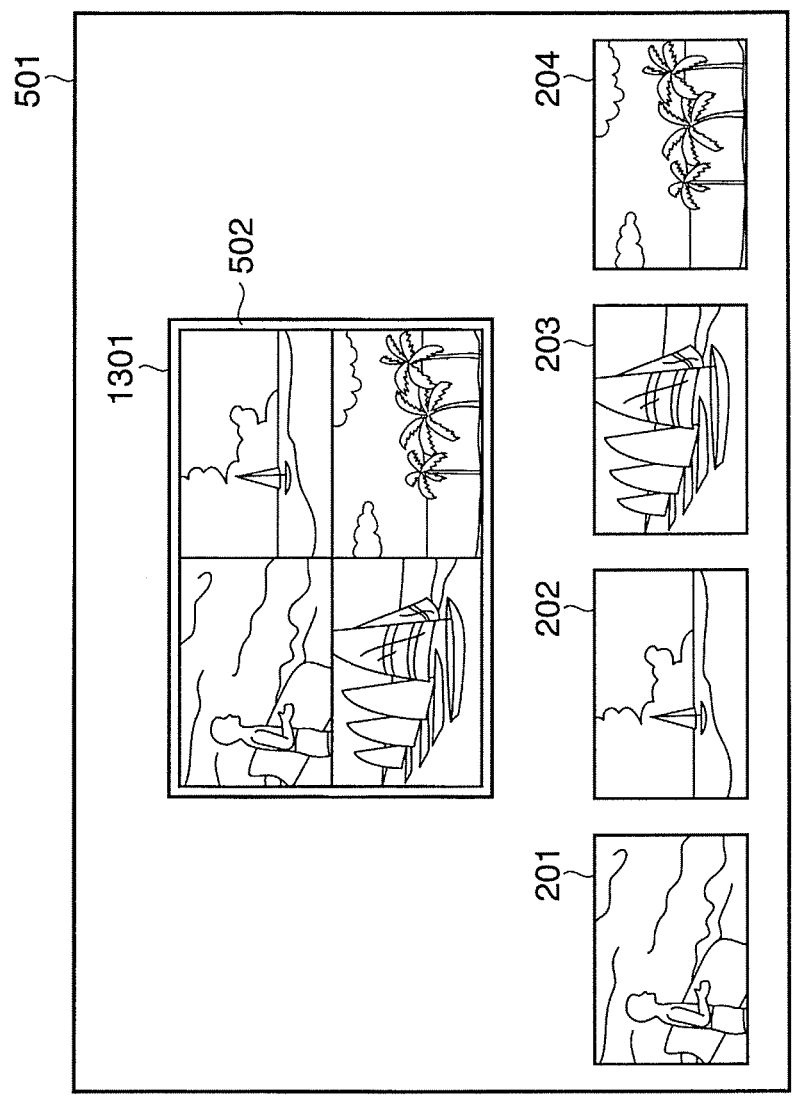
FIG. 13 illustrates one example of the print image selection window in modified example 2.
Figure 14:
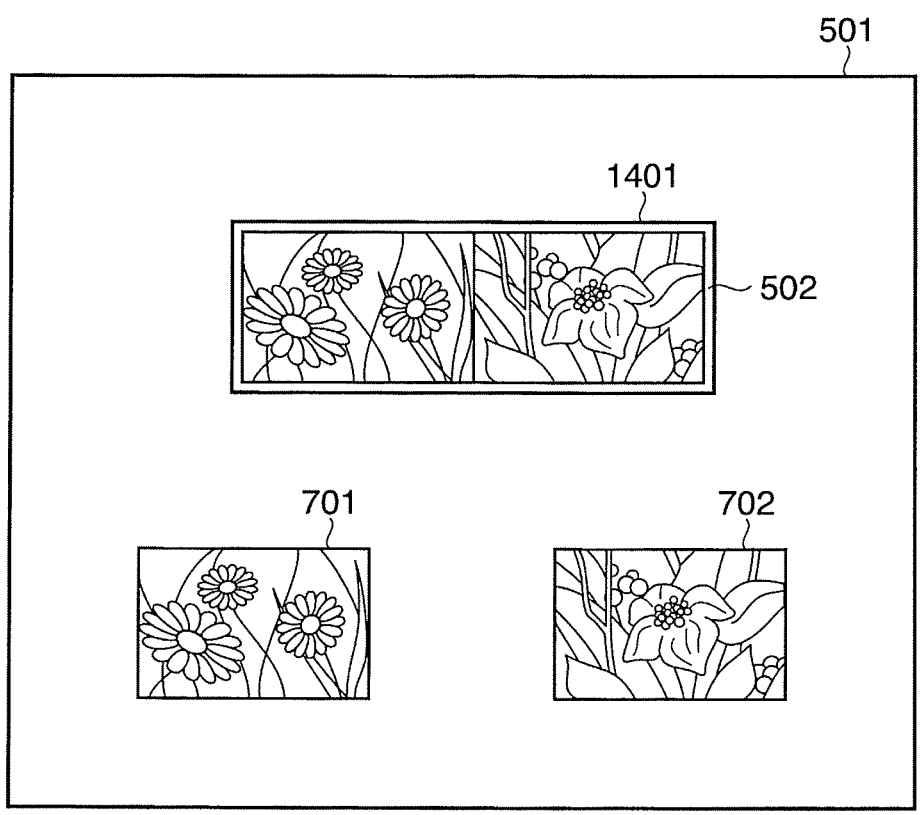
FIG. 14 illustrates another example of the print image selection window in modified example 2.

FIGS. 13 and 14 illustrate one example of the print image selection window 501 in modified example 2. FIG. 13 shows when the print button B3 of the user interface unit 110 is pressed in the state shown by symbol 1204 in FIG. 12. FIG. 14 shows when the print button B3 of the user interface unit 110 is pressed in the state shown by symbol 1206 in FIG. 12.

In modified example 2, when the print button B3 is pressed, the images being displayed on the display unit 50 are composed by the image processing unit 80 to generate a composite image. Then, a composite image such as the composite image 1301 (FIG. 13) or the composite image 1401 (FIG. 14) is displayed along with the images that constitute these (images 201 to 204 in FIG. 13) in the print image selection window 501. The layouts of the composite image 1301 and the composite image 1401 are different from the composite image 301 in that they are not made up of partial images but have all the images 201 through 204 lined up on a grid, for example. However, this layout is merely one example and these may have the same layout as the composite image 301 and the composite image 801. Furthermore, the configuration of the print image selection window 501 shown in FIG. 13 and FIG. 14 is merely one example and may be configured as shown in FIG. 11, for example.

It should be noted that if the print button B3 is pressed when there is only one image being displayed on the display unit 50 (as with symbol 1201 and 1205 in FIG. 12, for example), no composite image is generated. In this case, although it is not shown in the drawings, only the single image that was being displayed on the display unit 50 when the print button B3 was pressed is displayed.

Figure 15:
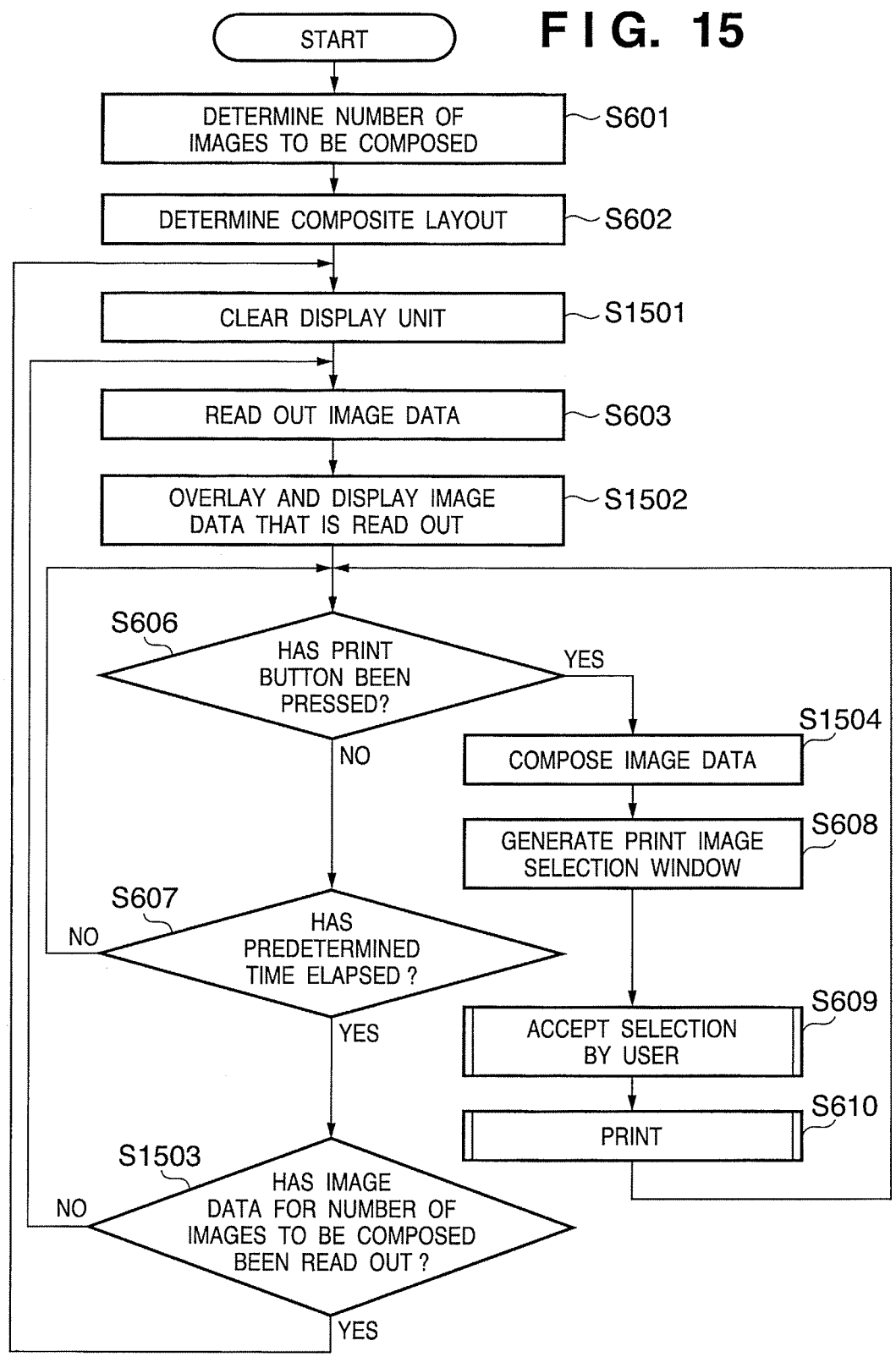
FIG. 15 is a flowchart showing a process flow in which the user selects an image to be printed during a slideshow in modified example 2.

FIG. 15 is a flowchart showing a process flow in which the user selects an image to be printed during a slideshow in modified example 2. In FIG. 15, steps in which the same processes as FIG. 6 are executed are assigned the same symbols; description thereof will be omitted.

In step S601 and step S602 in modified example 2, it is assumed that the number of images to be composed is 4 and "overlay/grid" is selected as the composition layout.

At step S1501, if any image is being displayed on the display unit 50, the main control unit 120 clears (deletes) it.

At step S1502, the main control unit 120 displays on the display unit 50 the image data that has been read out at step S603. If another image is already being displayed on the display unit 50, the image already being displayed is overlaid for display as shown in FIG. 12.

At step S1503, the main control unit 120 determines whether or not image data for the number of images to be composed has been read out. In other words, the main control unit 120 determines whether or not four images are overlaid and are being displayed on the display unit 50. If these have been read out, then the procedure returns to step S1501 and the same process is repeated. If these have not been read out, then the procedure returns to step S603 and the main control unit 120 reads out the next image data.

If the print button B3 of the user interface unit 110 is pressed at step S606, then at step S1504 the image processing unit 80 composes the image data being displayed on the display unit 50 and generates a composite image.

Figure 6:
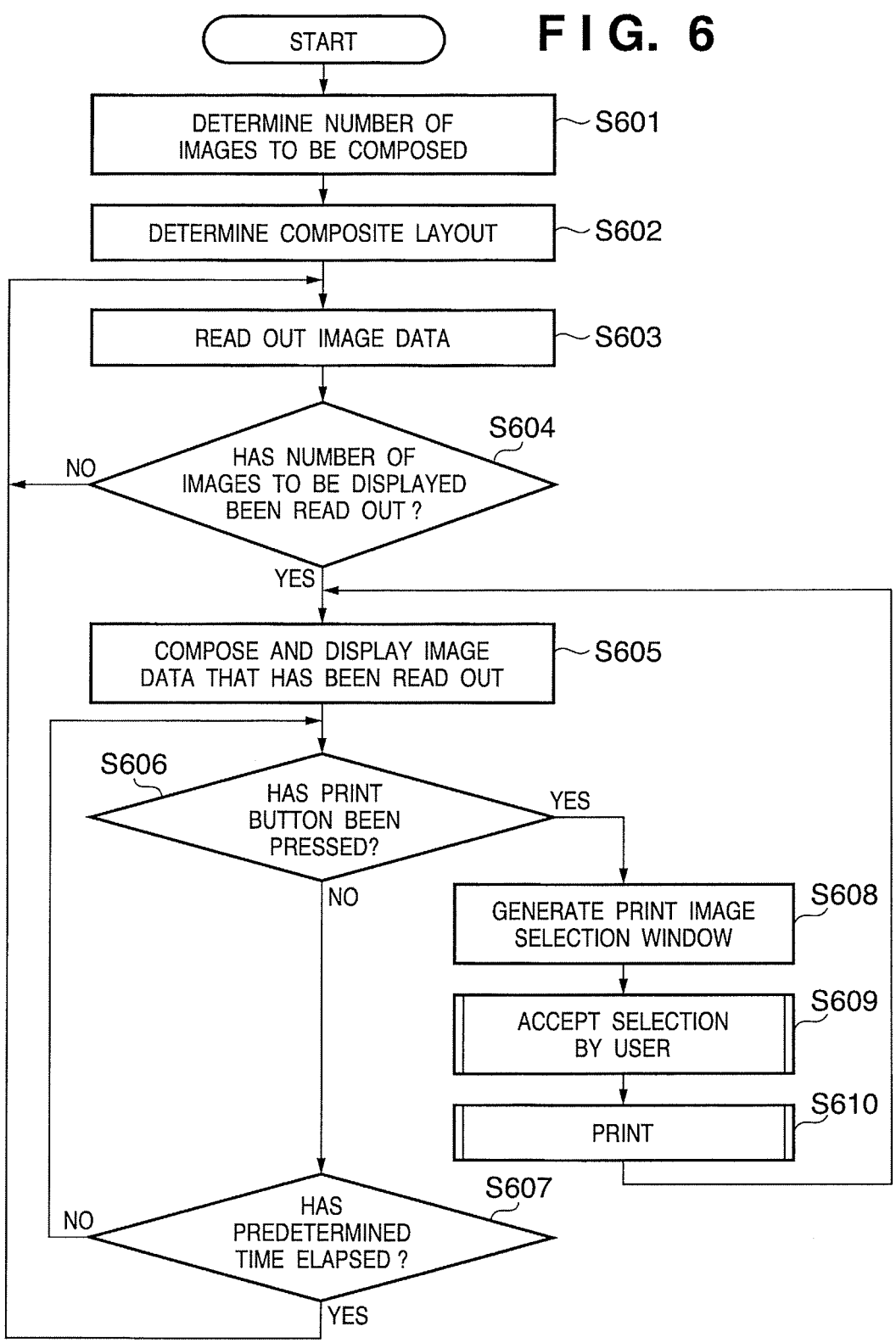
FIG. 6 is a flowchart showing a process flow in which an image to be printed is selected by a user from a composite image generated by the image processing unit of the DTV.

With the above-described process, the DTV 10 carries out a slideshow and performs printing in the same manner as in FIG. 6.

As described above, with the present embodiment, the DTV 10 generates a composite image by composing image data stored on the memory card 70 and displays this on the display unit 50 in a slideshow. When the DTV 10 receives a print instruction via the user interface unit 110 during the slideshow, the DTV 10 displays on the display unit 50 the print image selection window 501, which includes the composite image and the images that constitute the composite image. The DTV 10 prints the composite image or the image that has been selected via the print image selection window 501.

This makes it possible for a user to easily and flexibly select an image to be printed from a composite image. In other words, when a user discovers an image he or she wishes to print while viewing composite images in a slideshow, it is easy for the user to freely select and print the composite image or any of the images that constitute the composite image.

[Second Embodiment]

In the first embodiment a method was described in which the user selects an image to be printed while the DTV 10 is displaying composite images in a slideshow. However, the concept of the present invention is effective also when the method for displaying the composite images is not a slideshow. Moreover, the composite image may include elements other than images (for example, text and the like).

In the second embodiment, a result that has been interpreted by a Web browser application (browser) and displayed is given as an example of a composite image, and description is given of a method for the user to select an image to be printed in this case. Also, to facilitate description, the original document itself (an HTML document for example) to be interpreted by the browser is handled as a document containing images and text.

It should be noted that in the present embodiment, the document that is finally displayed and that contains images and text is handled as a composite image. Thus, as long as image portions are extractable, any application for display and any data format for the document may be used. Consequently, the present embodiment includes a case in which a word processor document is displayed by a viewer application. As specific examples, PDF documents, Word documents and the like may be used as documents other than HTML documents.

<System Outline>

Figure 16:
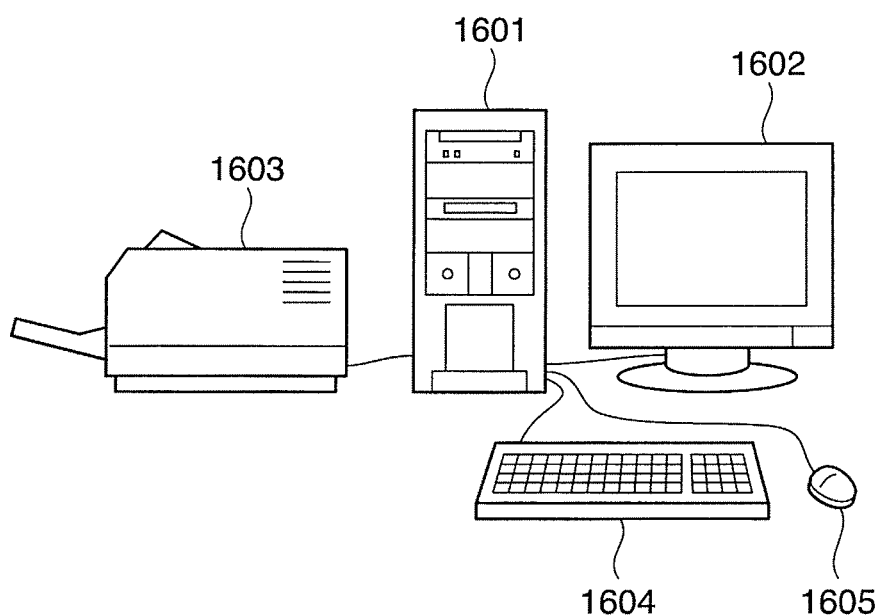
FIG. 16 shows an outline of a system in a second embodiment for a user to view a composite image (that is, an HTML document including images) and select an image for printing.

FIG. 16 shows an outline of a system in the second embodiment for a user to view a composite image (that is, an HTML document including images) and select an image for printing.

A PC (personal computer) 1601 is connected to a display 1602, a printer 1603, a keyboard 1604, and a mouse 1605.

A browser is installed in the PC 1601 and the user can view composite images through a window of the browser displayed on the display 1602. The browser installed in the PC 1601 is provided with a function for generating and displaying a print image selection window 1901 (see FIG. 19) for achieving a process according to the present embodiment.

The printer 1603 prints the composite image or the images contained in the composite image selected by the user.

It should be noted that "printing" includes "outputting" as a generic concept in the same manner as in the first embodiment. Thus, instead of the printer 1603, the PC 1601 may be connected to another PC (not shown in drawings) for example as an output unit.

The user can give instructions such as a print instruction to the PC 1601 using a user interface such as the keyboard 1604 and the mouse 1605.

<Process of Selecting Image to be Printed>

An outline of a process by which an image to be printed is selected by a user from a composite image 1701 (see FIG. 17) being displayed on the display 1602 is described with reference to FIGS. 17 to 19.

FIG. 17 illustrates a composite image 1701, which is one example of an HTML document displayed in the browser. The composite image 1701 includes images 1702 and 1703.

FIG. 18 shows source code of the HTML document that constitutes the composite image 1701. From FIG. 18 it is evident that the image 1702 has a file name of "42deec01.jpg" and the image 1703 has a file name of "42deec02.jpg".

FIG. 19 illustrates one example of the print image selection window 1901. When the PC 1601 receives a print instruction via the keyboard 1604 or the mouse 1605 or the like, the PC 1601 displays the print image selection window 1901 on the display 1602. The print image selection window 1901 includes the cursor 502, the composite image 1701, the image 1702, and the image 1703.

It should be noted that in the print image selection window 1901, in the same manner as the first embodiment, the composite image 1701 may be displayed larger and more emphasized than the image 1702 and image 1703 and although not shown in the drawings, other sizes and arrangements may also be employed.

In the print image selection window 1901, the user can move the cursor 502 by operating the keyboard 1604 and the mouse 1605 and select an image to be printed.

Figure 20:
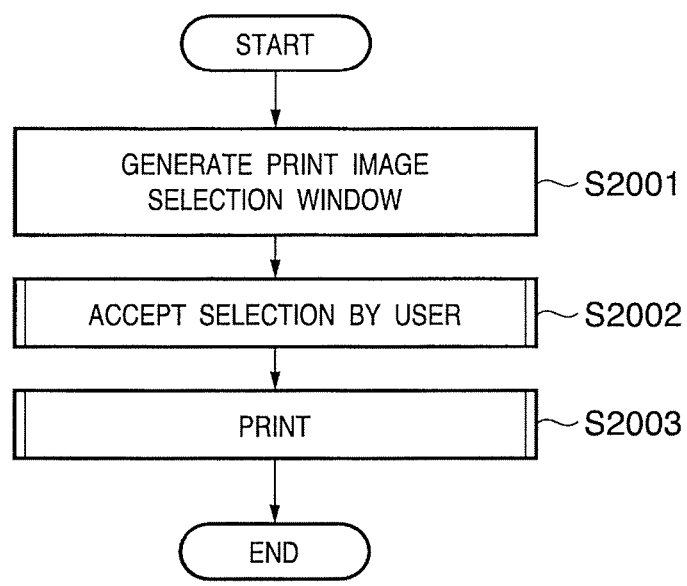
FIG. 20 is a flowchart showing a process flow in which an image to be printed is selected by a user from a composite image shown in FIG. 17 that is being displayed on the display shown in FIG. 16.

FIG. 20 is a flowchart showing a process flow in which an image to be printed is selected by a user from a composite image 1701 being displayed on the display 1602. When the PC 1601 receives a print instruction while the composite image 1701 is being displayed in the browser on the display 1602, the process of this flowchart commences.

At step S2001, the PC 1601 generates the print image selection window 1901 and displays this on the display 1602.

At step S2002, the PC 1601 accepts from the user via the keyboard 1604 and the mouse 1605 a selection of an image to be printed.

At step S2003, the PC 1601 instructs the printer 1603 to print the image selected at step S2002 and the printer 1603 executes printing.

As described above, with the present embodiment, when a print instruction is accepted from the user while a composite image is being displayed in the browser, the PC 1601 displays on the display 1602 the print image selection window 1901, which includes the composite image and the images contained in the composite image. The PC 1601 causes the printer 1603 to print the composite image or the image that has been selected via the print image selection window 1901.

This makes it possible for a user to easily and flexibly select an image to be printed from a composite image. That is, when viewing an HTML document in the browser, a user may sometimes desire to print the entire HTML document (composite image) and may sometimes desire to print a specific image contained in the HTML document. In such cases, with the present embodiment, the user can freely select the HTML document or any image that is contained in the HTML document, and easily carry out printing.

[Other Embodiment]

The processing described in the above embodiments may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a floppy® disk, a hard disk, an optical disk, a magneto-optical disk and the like can be used for providing the program codes. Also, CD-ROM, CD-R, a magnetic tape, a non-volatile memory card, ROM, and the like can be used.

Furthermore, the functions according to the above embodiments are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-035695, filed on Feb. 13, 2006, which is hereby incorporated by reference herein in its entirety.

What is claimed is:

1. An image processing apparatus, comprising:
a first display control unit adapted to display one or more images on a display unit while changing a number of images to be displayed, wherein when the number of images to be displayed is more than one, the first display control unit displays the images as a first composite image arranged such that one image is overlaid with another image;
a first acceptance unit adapted to accept an output instruction from a user during a period in which the one or more images are displayed by the first display control unit;
a second display control unit adapted to, in response to the output instruction, display on the display unit a selection window for selecting a target image to be output; and
an output unit adapted to output, to an external apparatus, an image selected by the user in the selection window as the target image to be output,
wherein if the output instruction is accepted during a period in which a plurality of images are displayed as the first composite image by the first display control unit, the second display control unit displays the selection window such that it shows (a) a second composite image generated from the plurality of images composing the first composite image such that they are not overlaid with each other and (b) each of the plurality of images composing the first composite image, wherein if the output instruction is accepted during a period in which only one image is displayed by the first display control unit, the second display control unit displays the selection window such that it shows the only one image and it does not show the second composite image, and wherein if the selected image is one of the plurality of images composing the second composite image, then the selected image is output by the output unit in a form that the selected image is not composited with another image.

2. The image processing apparatus according to claim 1, further comprising:

a second acceptance unit adapted to accept an instruction for selecting a maximum number of images to be displayed simultaneously on the display unit by the first display control unit, wherein when a time that has been determined in advance elapses, the first display control unit adds a single image for display on the display unit if a number of the images being displayed on the display unit has not reached the maximum number, and displays only the new single image on the display unit if the number of the images being displayed on the display unit has reached the maximum number.

3. The image processing apparatus according to claim 1, wherein in the selection window, the second composite image is displayed having a size larger than any of the plurality of images composing the first composite image.

4. The image processing apparatus according to claim 1, wherein in the selection window, the second composite image and each of the plurality of images composing the first composite image are displayed having an equivalent size.

5. An image processing method, comprising:

a first display control step of displaying one or more images on a display unit while changing a number of images to be displayed, wherein when the number of images to be displayed is more than one, the first display control step displays the images as a first composite image arranged such that one image is overlaid with another image;

a first acceptance step of accepting an output instruction from a user during a period in which the one or more images are displayed by the first display control step;

a second display control step of, in response to the output instruction, displaying on the display unit a selection window for selecting a target image to be output; and an output step of outputting, to an external apparatus, an image selected by the user in the selection window as the target image to be output, wherein if the output instruction is accepted during a period in which a plurality of images are displayed as the first composite image by the first display control step, the second display control step displays the selection window such that it shows (a) a second composite image generated from the plurality of images composing the first composite image such that they are not overlaid with each other and (b) each of the plurality of images composing the first composite image, wherein if the output instruction is accepted during a period in which only one image is displayed by the first display control step, the second display control step displays the selection window such that it shows the only one image and it does not show the second composite image, and wherein if the selected image is one of the plurality of images composing the second composite image, then the selected image is output by the output step in a form that the selected image is not composited with another image.

6. A computer program stored in a computer-readable storage medium, which causes a computer to execute an image processing method, the image processing method comprising:

a first display control step of displaying one or more images on a display unit while changing a number of images to be displayed, wherein when the number of images to be displayed is more than one, the first display control step displays the images as a first composite image arranged such that one image is overlaid with another image;

a first acceptance step of accepting an output instruction from a user during a period in which the one or more images are displayed by the first display control step;

a second display control step of, in response to the output instruction, displaying on the display unit a selection window for selecting a target image to be output; and an output step of outputting, to an external apparatus, an image selected by the user in the selection window as the target image to be output, wherein if the output instruction is accepted during a period in which a plurality of images are displayed as the first composite image by the first display control step, the second display control step displays the selection window such that it shows (a) a second composite image generated from the plurality of images composing the first composite image such that they are not overlaid with each other and (b) each of the plurality of images composing the first composite image, wherein if the output instruction is accepted during a period in which only one image is displayed by the first display control step, the second display control step displays the selection window such that it shows the only one image and it does not show the second composite image, and wherein if the selected image is one of the plurality of images composing the second composite image, then the selected image is output by the output step in a form that the selected image is not composited with another image.

7. A computer-readable storage medium on which the computer program according to claim 6 is stored.

* * * * *